180-248 54

XR RE 28,324

(4)

Jan. 28, 1975 C. K. GREENE Re. 28,324

HYDRAULIC DRIVE FOR MULTI-AXLE VEHICLES

Original Filed Jan. 14, 1971 3 Sheets-Sheet 1

INVENTOR:
CLARENCE KIRK GREENE
BY: Milmore & Copeland
HIS ATTORNEYS

RE28324
OR IN 18-/22

HYDRAULIC DRIVE FOR MULTI-AXLE VEHICLES

Original Filed Jan. 14, 1971 3 Sheets-Sheet 2

INVENTOR:
CLARENCE KIRK GREENE
BY: Milmore + Cyker
HIS ATTORNEYS

HYDRAULIC DRIVE FOR MULTI-AXLE VEHICLES

Original Filed Jan. 14, 1971 3 Sheets-Sheet 3

INVENTOR:
CLARENCE KIRK GREENE
BY: Milmore & Cooper
HIS ATTORNEYS

United States Patent Office

Re. 28,324
Reissued Jan. 28, 1975

28,324

HYDRAULIC DRIVE FOR MULTI-AXLE VEHICLES

Clarence Kirk Greene, Arlington Apartments, 100 N. Arlington Ave., Reno, Nev. 89501

Original No. 3,680,652, dated Aug. 1, 1972, Ser. No. 106,606, Jan. 14, 1971, which is a continuation-in-part of abandoned application Ser. No. 793,468, Jan. 23, 1969. Application for reissue Nov. 1, 1973, Ser. No. 411,727

Int. Cl. B60k 17/14

U.S. Cl. 180—22 18 Claims

Matter enclosed in heavy brackets [ ] appears in the original patent but forms no part of this reissue specification; matter printed in italics indicates the additions made by reissue.

ABSTRACT OF THE DISCLOSURE

In [a] vehicle *means* having wheels mounted on different axles and a power plant, the latter is drivingly connected to the input shaft of a differential pump the output shaft of which is mechanically coupled to the driving wheels on one axis, and the driving wheels on [the other] *another* axis are driven by one or more positive displacement hydraulic motors which receive fluid from the pump. The pump is a positive-displacement pump which has an output shaft rotating at a speed equal to that of the input shaft when the flow of pumped fluid is blocked, the speed decreasing progressively as more fluid is pumped, due to reduced external flow resistance. The two axes may be at the rear of the vehicle or, respectively, at the front and rear. When the hydraulic motors are of effectively variable displacement, the torque on the first-mentioned wheels remains about constant, in relation to that of the differential pump input shaft (except as this can be altered by the interposition of a mechanical gear shift), but that applied to the other wheels decreases as the motor displacement is decreased while the vehicle *means* gains speed; concurrently, the speed of the former wheels increases. Fixed-displacement hydraulic motors can be used. A by-pass valve across the differential pump, when opened, reduces the torques on all driving wheels essentially to zero.

This is a continuation-in-part of my copending application Ser. No. 793,468, filed Jan. 23, 1969, now abandoned.

The invention relates to a hydraulic drive system for self-propelled [vehicles] *vehicle means* which have a power plant and a plurality of ground-engaging driving means, such as tracks or wheels (hereinafter, for convenience, referred to as wheels) rotatable on different axes which are displaced along the length of the vehicle *means*. More particularly, the invention is concerned with a hydraulic drive system which distributes the torque from the power plant among the driving wheels on the said different axes, which may be all at one end of the vehicle *means* or, respectively, at the front and rear thereof.

It is frequently necessary or desirable to distribute the torque from a vehicular power plant among several wheels in a manner that permits the driven wheels to rotate at different speeds and/or to receive different driving torques. For example, in automotive trucks having a plurality of rear driving wheels situated for rotation on different transverse axes, it is desirable to apply a driving torque to all rear wheels. It is known to do this by various arrangements, as by driving the pair of wheels on the forward of the two rear axles by a mechanical differential from the transmission and to drive each of rearmost wheels by gears from the wheels immediately in front of them. Apart from constraining the rearmost wheels to rotate at the speeds of the wheels in front of them—which is often not desirable due to differences in the [trend] *tread* diameters of the wheels caused by non-uniform tire wear or tire inflation—this causes difficulties when the wheels are mounted on the vehicle by means, such as springs or tiltable bolsters, which permit relative rotation between the wheel axles. This relative motion can introduce relative motion between the wheels when they are mechanically interconnected in driving relation, and special arrangements are necessary to accommodate this relative rotation.

As another example, it is in some cases desirable to apply a variable driving torque to the wheels on one vehicle axis in a way which simultaneously alters the speed of rotation of the driving wheels on another axis in the relation to the speed of the power plant output shaft. For example, it is useful, e.g., in racing cars, to apply a driving torque to all, such as all four, wheels when first placing the vehicle into motion from a standstill for gaining high traction, and thereafter to decrease the torque on one set of wheels, such as the rear wheels, gradually toward or to zero while progressively increasing the speed of rotation of the other wheels relatively to the speed of the power plant output shaft.

Moreover, it is often convenient to arrange a hydraulic drive system for wheeled vehicles so as to eliminate the need for a clutch or a mechanism which alters the displacement of a pump and, instead, to control the torque applied to the wheels by regulating the flow of hydraulic fluid in the transmission system in a simple way, as by the use of a throttling valve.

Various hydraulic power transmission systems are known for attaining similar objects. For example, the system of U.S. Pat. No. 3,053,043, Sept. 11, 1962, provides a conventional clutch and gear box between the vehicle engine and the differential gear through which the front wheels are driven, and a variable-displacement pump which is also driven by the engine is hydraulically connected to separate hydraulic motors which drive the rear wheels through clutches, suitable mechanism being provided for changing the pump displacement and controlling the clutches. Such a system is complex, and its operability depends upon the timely engagement of the clutches at the rear wheels to prevent the motor from pumping hydraulic fluid.

The hydraulic drive system according to U.S. Pat. No. 3,361,223, Jan. 2, 1968, avoids the use of clutches between the hydraulic motors and the wheels driven thereby but uses a hydraulic control system for maintaining a substantially constant pressure in the pumped fluid by varying the displacement of the pump automatically. This control system and the use of a variable displacement pump complicate the system. Other previously proposed systems utilize a still more complex pump, called a hydromechanical power transmission unit, in which a part of the power is transmitted mechanically and another part is transmitted hydraulically by means of a variable-displacement hydraulic motor acting on the output shaft. As an example, U.S. Pat. No. 3,354,977, Nov. 28, 1967, employs the hydromechanical power transmission [used] *which is* described in U.S. Pat. No. 3,151,-456, Oct. 6, 1964. According to the former patent, the rear wheels are driven by the output shaft of the hydromechanical transmission unit, and the front wheels by hydraulic motors which are connected by ducts to conduct some of the hydraulic fluid from the pump of the transmission unit, a valve being interposed in these ducts whereby the front wheels can be placed into forward or reverse drive or neutral. This arrangement is costly, in that the transmission unit employs a variable-displacement pump and a variable-displacement motor, the latter being in addition to the hydraulic motor which mechanically [aid] *aids* in driving the front wheels.

An object of the invention is to provide a simple hydraulic transmission system for distributing power among the driving wheels of [a] vehicle *means*, by using one or more hydraulic motors to drive a part of the vehicular wheels and supplying hydraulic fluid to said motor(s) by a fixed-displacement, positive-displacement, differential pump which is driven by the vehicle's power plant and has an output shaft which is mechanically connected to drive other vehicle wheels. The term "differential pump" is used herein to denote a pump which has a power input shaft, an output shaft, and which contains mechanical reacting means to drive the output shaft at a speed which decreases as the quantity of fluid pumped (*per unit time*) increases. In the differential pump shown herein, the reacting means includes pistons and a pump block. However, it is also possible to use other reacting means, for example, a vane-pump construction as described in my copending application, Ser. No. 82,561, filed Oct. 21, 1970, *now U.S. Pat. No. 3,702,642, Nov. 14, 1972.*

A specific object, attained in a preferred embodiment, is to obviate the need for a clutch by permitting the differential pump to pump hydraulic fluid against a negligible opposing pressure or opposition, thereby achieving an idling condition in which the vehicle is at a standstill, or a condition of substantially zero power transmission, to permit gears to be changed, e.g., to place the vehicle into reverse or to change the gear ratio (when gear ratio changing means are provided).

Another object, attained in one embodiment, is to provide a flexible and economic drive system for driving the several driving wheels at one end, usually the rear, of [a] vehicle *means*, such as an automotive truck, which applies torque to the wheels mounted on different axes but avoids the previously stated difficulties of mechanically gearing the rearmost wheels to those in front of them, and permits the wheels to rotate at slightly different speeds; it further avoids the relative rotation when these wheels are moved relatively to each other.

Another object, attained in another embodiment, is to provide a flexible and economic hydraulic drive system which permits the torque to be applied to some wheels to a variable degree, e.g., to permit such torque to be reduced gradually to zero, while increasing the speed of other driven wheels in relation to the speed of the output shaft of the vehicle's power plant.

Additional objects will become apparent from the following description.

In summary, the hydraulic drive system of the invention comprises a fixed-displacement differential pump which is driven by the vehicle power plant and has an output shaft mechanically connected to a part of the vehicle wheels, e.g., through a mechanical differential gear which drives two wheels on one axis, and one or more positive displacement hydraulic motors which are hydraulically connected to the said pump and mechanically connected to drive another part of the vehicle wheels, e.g., on an axis which is displaced from the first-mentioned axis, either at the same or at a different end of the vehicle. Preferably, a by-pass duct having a flow-control valve is provided between the hydraulic output and input openings of the pump, whereby the torques applied [to] both *to* the pump output shaft and to the wheels which are driven by the hydraulic motor or motors can be reduced to practically zero by opening the valve. This valve may advantageously be of the type that can be opened gradually, and servo-mechanism may be provided to open it rapidly upon operation of a gear, such as a reversing or a ratio-changing mechanism.

In one embodiment, the hydraulic motor or motors are of the fixed, positive-displacement type, whereby torque is applied to all motor-driven wheels whenever torque is applied to any *such wheel*. This embodiment is especially useful for driving the rear wheels of an automotive truck, the shaft of the differential pump output being then connected to the differential gear of one set of wheels, e.g., the front set of the rear wheels (if desired through a gear box by which the gear ratio can be altered) and the hydraulic motor or motors are drivingly connected to the other set of wheels. The wheels driven by the pump output shaft can, of course, be the front wheels.

In another embodiment, the hydraulic motor or motors is (are) of the variable displacement type, whereby the torque applied to the wheels driven by the hydraulic motors can be reduced gradually as the speed of the wheels which are driven mechanically by the pump output shaft is increased in relation to the speed of the pump input shaft or of the power plant. This embodiment is of especial utility in racing cars, in which the pump output shaft is connected to the differential gear of one set of wheels, e.g., the front wheels, and the *other wheels, e.g., the* rear wheels, are driven by one or more variable-displacement hydraulic motors which receive hydraulic fluid from the pump. This permits torque to be applied to all four wheels to obtain good traction when needed, as when accelerating or ascending a grade or the like, and the torque on the hydraulic motor-driven wheels can be reduced to zero while increasing the speed of the power plant as the vehicle gains speed.

To overcome the drawback of variable-displacement hydraulic motors [of having] *which have* very poor efficiencies at low displacements, I may achieve different effective displacements by using fixed-displacement motors and altering their [connection] *connections* to the differential pump by means of a valve, the motors being entirely disconnected and flow of fluid from and into the differential pump being blocked when no torque is applied to the wheels driven by these motors. Such an arrangement is shown in the aforesaid [copending patent application, Ser. No. 82,561] *U.S. Pat. No. 3,702,642*, the disclosure of which is incorporated herein by reference.

To permit the hydraulic motor or motors to be of small size, it is desirable to operate them at a high speed. This can be facilitated by providing a gear reduction unit between the hydraulic motor or motors and the wheel or wheels driven thereby.

In any embodiment, the differential pump and/or the hydraulic motor or motors can be of any type, e.g., axial, radial or vane. For example, they may have cylinders which extend *in* parallel to the rotating shaft or which extend radially therefrom, or, as is shown in the aforesaid [application, Ser. No. 82,561] *U.S. Pat. No. 3,702,-642*, the pump chambers can be the spaces between vanes which slide generally radially within a rotor.

The invention will be further described with reference to the accompanying drawings which form a part of this specification and show certain preferred embodiments by way of illustration, wherein.

Figure 1:
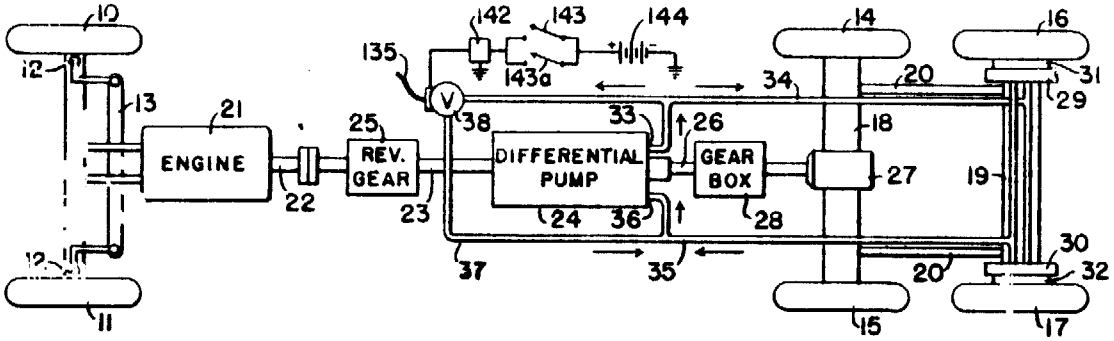
FIG. 1 is a diagrammatic plan of parts of a vehicle equipped with the hydraulic drive system, the vehicle having four driving wheels at the rear, mounted on two parallel axes.
Figure 3:
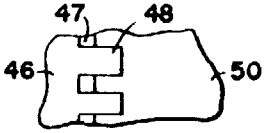
FIG. 3 is a fragmentary plan of the connection between the swash plate frame and skirt of the pump of FIG. 2.
Figure 2:
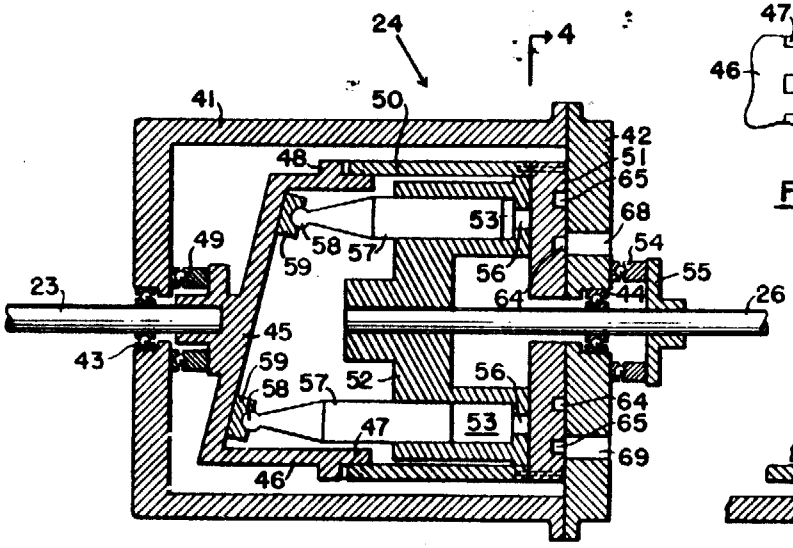
FIG. 2 is a longitudinal section through a differential pump, taken on the line 2—2 of FIG. 4, certain parts appearing in elevation and only the main elements being shown.

Having reference to FIG. 1, the vehicle has steerable front wheels 10, 11, pivoted to the vehicle chassis (not shown) by king pins 12 and provided with suitable steering mechanism, represented generally at 13; and rear wheels 14–17, mounted for independent rotation on two rear axes which are displaced along the length of the vehicle, the rear wheels rotating on or with axles contained with transverse housing 18 and 19. Connected to, e.g., fixed to, the under sides of these housings, are longitudinal springs or rigid, tiltable bolsters 20 which support the rear end of the chassis by known attachments which, usually, permit relative motion between the housings 18 and 19 and the wheels carried thereby, as by flexure and/or rocking of the springs or bolsters 20. The chassis carries a power plant 21, such as an internal combustion engine, having a power output shaft 22 which is connected to the input shaft 23 of a differential pump 24, optionally through a reversing gear represented by the box 25. This gear unit may, if desired, include a clutch; however, as will appear, a mechanical clutch is not necessary with this drive system. The differential pump 24 is of the positive-displacement type and has a pump output shaft 26 which is mechanically connected to a differential gear 27 of the front set of drive wheels 14 and 15 to drive these wheels mechanically. Preferably there is a gear box 28 between the pump output shaft 26 and the gear 27 to change the gear ratio. Each of the rearmost wheels 16 and 17 is provided with an individual hydraulic motor 29 or 30, or any suitable type, such as a radial, an axial or a vane motor. Although variable-displacement motors, e.g., as shown in FIGS. 7–11 can be used, they are, in this embodiment, preferably of the fixed-displacement type, since they drive the rearmost wheels continuously. Each motor has its output shaft connected drivingly to one of the wheels 16 or 17, advantageously through speed-reducing gear units 31 and 32, respectively, to permit these motors to have their output shafts rotate faster, e.g., two to ten times as fast as, the driven wheels. These motors receive hydraulic fluid under pressure from the high-pressure discharge outlet 33 of the differential pump via a branched duct 34, and hydraulic fluid is returned from the motors via a branched duct 35 to the fluid inlet 36 of the pump. In other words, the hydraulic motors are connected hydraulically in parallel to the pump. A by-pass duct 37, having a flow-control valve 38, is connected across the pump, as by connecting its ends to the ducts 34 and 35. This valve can be operable from the driver's compartment and may have a gradually variable flow-restricting characteristic, which can be regulated by the position of its operating stem.

Figure 6:
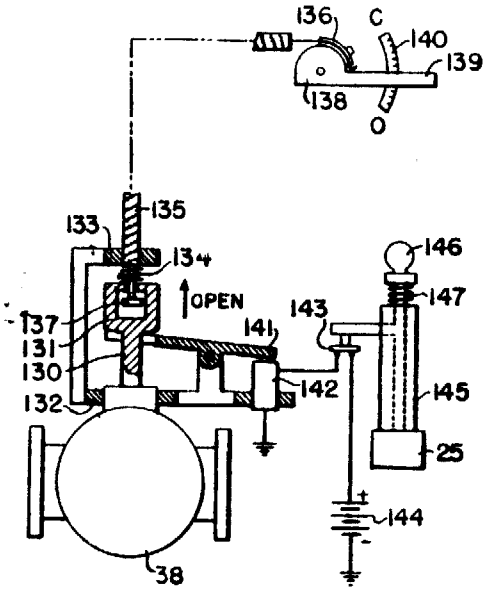
FIG. 6 is a diagrammatic view of the valve-control mechanism.

Any type of servo-mechanism, which may be mechanical, electric or pneumatic, or a combination of these, can be provided for operating the valve 38, being preferably of the type which permits a gradual opening and closing of the valve by manual control of the vehicle operation of the reversing gear 25 and of the ratio gear 28, followed by a closing of the valve when the gear-changing operation is completed. For example FIGS. 1 and 6 show one possible arrangement which is partly mechanical and partly electrical. The valve 38 has an operating stem 130 which opens the valve progressively when raised and closes it when lowered. The stem carries fixed thereto a housing 131 which provides an abutment at its bottom and an apertured wall at its top. Rigidly fixed to the valve housing is a collar 132 which has an annular flange 133 spaced above the housing 131, and a compression spring 134 acts between this flange and the housing 131 to urge the stem 130 downward for closing the valve. The valve stem is pulled upward to open position by a flexible cable 136 which is axially slidable within a longitudinally rigid but laterally bendable, tubular guide 135, e.g., made of coiled wire, which is fixed to the flange 133. One end of the cable carries an enlarged head 137 that is vertically movable within the housing but is large enough to abut the top wall to pull it and the stem 130 upwards. The other end of the cable is secured to a movable arcuate frame 138 which has a pivotal mounting within the vehicle operator's compartment and has a handle 139 which can be held in any desired angular position by engagement with serrations in a stationary, arcuate-shaped piece 140. Depressing the handle 139 toward the "0" position shortens the cable 136 to open the valve.

For quick, temporary opening of the valve, there is an armature 141 which is pivotally mounted to a frame of the collar 132 and has one end bifurcated to engage the lower face of the housing 131. The collar frame also carries in relatively fixed position a solenoid 142 which, when energized, attracts the shorter end of the armature 141, thereby rocking it to the position shown and opening the valve. The solenoid is connected to a circuit which is controlled by one or more switches 143, 143a, connected in parallel and normally open and in circuit between the solenoid and a source of electrical potential, such as a battery 144, the other sides of the solenoid and the battery being grounded. As appears in FIG. 6, the switch 143 is controlled by the lever 145 of the reversing gear 25 through its locking mechanism. The latter includes a knob 146 which is urged upwards by a spring 147, and the lever is locked against operation by a suitable mechanism (not shown) when the knob 146 is raised. Also fixed to the knob is a lateral arm which engages a part of the switch 143 to close the switch whenever the knob is depressed. This energizes the solenoid 142 to open the valve 38 fully, regardless of the position of the handle 139. When the knob 146 is released, it raises due to the spring 147, opening the switch 143 and de-energizing the solenoid; this permits the valve stem 130 to descend under the action of the spring 134 to the position determined by the position of the head 137.

FIG. 1 shows an additional switch 143a, which is similarly controlled by the operation of the operating lever of the gear box 28, so that operation of this gear box also opens the valve 38 completely and temporarily until manipulation of the gear level is completed.

The complete opening of the valve 38 by any of the three controls described above permits hydraulic fluid to flow freely through the valve and causes the torque applied to the driven wheels 14–17 to be reduced to almost zero. Yet, when setting of either gear has been completed, the valve 38 returns to the position previously determined by the lever 139.

One specific example of a differential pump is shown in its essential elements in FIGS. 2–5. It includes a housing 41 which is closed by a stationary valve plate 42 and is provided with bearings 43 and 44 for the pump input shaft 23 and the pump output shaft 26, respectively, these shafts being coaxial. The input shaft has fixed to its inner end a swash plate 45 the flat face of which is directed toward the plate 42 and is inclined to the normal to the shaft axes by a desired angle, preferably large, as indicated. Suitable anti-friction arrangements are provided to permit shoes 59 (to be described) to move relatively to it; for example, this face can be highly machined. Projecting from the swash plate 45 is an annular positioning frame 46 having an annular flange 47 and serrations or projections 48 which are directed toward the plate 42. A thrust bearing 49 may be interposed between the swash plate and the end wall of the housing or casing 41. An orienting skirt 50 having indentations or notches in its end to receive the projections 48 is positioned about the flange 47, whereby it is capable of free axial movement relatively to the frame 46 but is constrained to rotate in unison therewith. A rotatable valve plate 51 is fixed by screws to the end of the skirt for rotation therewith and is centered about the axis of the shaft 26 by engagement of the inside of the skirt 50 with a rim which is externally circular and is formed at the rear of an annular cylinder or pump block 52 with relative sliding rotary motion. The pump block is fixed to the inner end of the output shaft 26 for rotation therewith. Both faces of the valve plate 51 and the contiguous faces of the stationary valve plate 42 and the pump block are highly machined. These faces are in close, relatively sliding relation, urged thereto by the pressure of hydraulic fluid within pump chambers 53 which are formed within the pump block and lie parallel to the shaft axes. However, this relative position may be further insured by a thrust bearing 54 which acts between the outside of the stationary valve plate 42 and the shaft 26 to which it is secured by a collar 55.

The pump block 52 contains a ring of any desired number, such as six to 12, pump chambers 53, each chamber having a port 56 at its rear end which extends to the valve plate 51 and containing a reciprocable piston 57 which has a rounded head 58 at the end away from the pump chamber. Each round piston head fits into a shoe 59 which is in sliding relation to the smooth face of the swash plate 45, for example, by having the bases of the shoes highly machined. These shoes are self-adjusting and are pressed against the swash plate by the pressure of fluid within the pump chambers in the embodiment shown, although other arrangements for maintaining a pressure against the swash plate, even with reduced fluid pressure within the pump chambers as on the suction strokes thereof, may be used. Further, it is evident that other known or suitable anti-friction arrangements between the pistons 57 and the swash plate 45 may be used.

Figure 5:
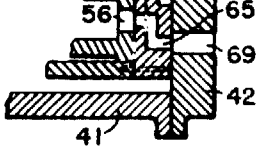
FIG. 5 is a section, taken on the line 5—5 of FIG. 4, showing the communications of certain ports and grooves.
Figure 4:
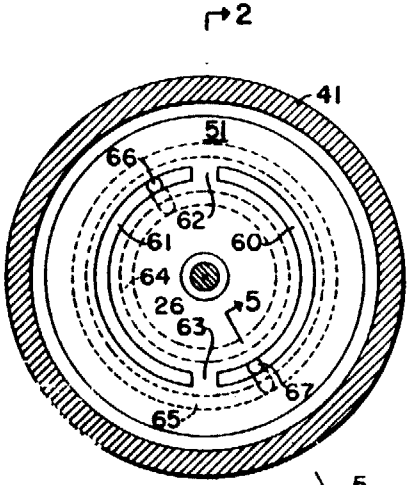
FIG. 4 is a plan of the rotatable valve plate, being a section taken on the line 4—4 of FIG. 2.

The valve plate 51 has formed in its face toward the pump block 52 a pair of almost semi-circular grooves 60 and 61, of equal arcuate lengths and radii, which communicate with the ports 56; but these grooves are isolated from each other by lands 62 and 63, which are continuous with the face of the valve plate. These lands are circumferentially long enough to close one of the ports 56 (as appears in FIG. 2), so that each groove communicates with one less than half of the ports 56 (assuming there to be an even number of pump cylinders). Communication is shown in FIG. 5. A pair of annular grooves 64 and 65, of different diameters, is formed on the face of the plate 51 which engaged the plate 42, the latter grooves being in communication with the grooves 61 and 60, respectively, via internal passages 66 and 67. The grooves 64 and 65 are at all times in communication with ports 68 and 69, respectively, which extend through the plate 42 and constitute the high-pressure fluid outlet 33 and the fluid inlet 36, respectively, previously mentioned. FIG. 5 shows the communication of one of the ports 56 via the passage 67 and the groove 65 with the port 69; a similar communication exists between other ports 56 via the passage 66 and the groove 64 wtih the port 68. The valve plate 51 is oriented by the skirt 50 and the projections 48 relatively to the swash plate 45 so that the groove 61 (and, hence, the port 68) is in communication with those pump chambers 53 wherein the pistons 57 are moving inwardly to contract the pump chambers when the input shaft 23 and the swash plate are rotated in their normal direction (with the reversing gear 25 set for forward drive); thereby the groove 60 (and, hence, the port 69) is in communication with those pump chambers in which the pistons are moving outwardly. The lands 62 and 63 close the pump chambers whose pistons are at the ends of their strokes. Since the skirt 50 can move axially with respect to the swash plate, the valve plate 51 can be sealed against the plate 42 despite small changes in length due to wear, temperature changes or the like.

When the direction of rotation of the input shaft 23 and the swash plate is reversed, fluid is pumped out of the port 69 and drawn into the port 68.

It is evident that the differential pump is of the fixed-displacement type, thereby obviating mechanism for altering the displacement. It will be understood that this pump would be provided with additional accessories, not shown but well understood in the art. Among these are a reservoir for hydraulic fluid, pressure-relief valves for preventing excessive fluid pressure in the ducts 34, 35 and 37, an auxiliary pump for priming the pump chambers, and sealing means. Also, other forms of differential pumps, for example the vane pump as shown in the aforesaid copending patent application, Ser. No. 82,561, may be used.

The valve 38 in the by-pass duct permits torque to be applied to or effectively removed from the output shaft 26 and from the wheels 16 and 17. Thus, when this valve is open, rotation of the pump input shaft 23 causes the pump chambers to be contracted against only small opposition, and hydraulic fluid is pumped through the valve against a negligible pressure; thereby the pressure in the duct 34 is insufficient to drive the hydraulic motors 29 and 30 and turn the rearmost wheels. Also, the torque transmitted from the swash plate via the pistons 57 to the pump block 52 and, hence, to the output shaft 26 is negligible because the pistons reciprocate against very low fluid pressure. However, when the valve 38 is closed the pressure within the duct 34 rises and the hydraulic motors 29 and 30 are driven; also, the pistons 57 cause a mechanical reaction between the swash plate 45 and the pump block 52, whereby the output shaft 26 is rotated with a torque substantially equal to that in the pump input shaft 23. However, the speed of rotation of the output shaft 26 is less than that of the input shaft when fluid is pumped, becoming smaller as the volume of fluid pumped through the ports 68 and 69 increases.

It will be understood that the driving torque applied to the rearmost wheels 16 and 17 can be made substantially equal to that applied to the wheels 14 and 15 by a choice of the displacements of the differential pump and of the hydraulic motors 29 and 30, having regard to the gear reduction units 31 and 32. Yet the hydraulically driven wheels 16 and 17 are not geared to the driving wheels 14 and 15, but each wheel can assume its own speed, as is determined by its tread diameter. Also changes in the relative positions of the wheels caused by irregularities in the roadway and involving flexure or tilting of the springs or bolsters 20 are possible without relative turning of the wheels due to relative gearing. Finally, the need for a differential gear on the rearmost axle is obviated by using separate hydraulic motors 29 and 30.

Whenever the gear ratio in the gear box 28 is altered, and/or when the gear box 25 is operated, the valve 38 is temporarily opened, as by the means previously described with reference to FIG. 6, to suppress the application of torque. It may be noted that this temporary opening of the valve 38 and the presence of the parts 141–144 are not necessary with gear constructions which permit gear operation without a clutch, or when the gear boxes include clutches.

Changing the gear ratio in the box 28 in a direction to cause the wheels 14 and 15 to rotate more slowly in relation to the pump output shaft 26 (herein called a reduction in the gear ratio) applies more torque to these wheels in relation to the torque in the shaft 26. This also causes the hydraulic motors 29 and 30 to draw less fluid, due to their reduced speed (determined by engagement of the wheels 16 and 17 with the ground), whereby the speed of the output shaft 26 is greater than previously in relation to the speed of the vehicle and the pump input shaft 23.

For example, if the gear box 28 is operated to reduce the gear ratio to one-half of a pre-existing ratio, the forward speed of the vehicle remaining constant, the speed of the output shaft 26 is doubled. But the flow rate of fluid flowing through the motors remains the same. Hence the volume of fluid pumped per revolution of the output shaft 26 is reduced by one-half. The speed of the pump input shaft 23 (and, hence, of the engine 21) will therefore increase by a factor .o accommodate these conditions. It is evident that the last-mentioned speed increases to 1.5 times the prior speed.

When placing the vehicle into motion from a standstill, the valve 38 is initially opened by operation of the handle 139 and the engine is started. The valve 38 is then closed. Gradual closing is often desirable to avoid subjecting the system to shock.

The hydraulic drive system described permits the engine to retard the vehicle when it is decelerating or descending a grade. Under these conditions the input shaft 23 is driven by the output shaft 26 and the pump block 52 via the pistons and the swash plate also, the hydraulic motors 29 and 30 act as pumps, forcing hydraulic fluid into the port 69, which further tends to drive the swash plate and the input shaft 23.

While fixed displacement hydraulic motors were used in the first embodiment, a variable-displacement motor can be used. This is illustrated in the second embodiment, shown in FIG. 7, as applied to a four-wheel drive vehicle, which may be a racing car; but the drive system may be applied to other vehicles. The vehicle has steerable front wheels 70 and 71 having pivotal driving connections at 72 to a transverse axle for each wheel situated within a transverse axle housing 73, and a steering mechanism indicated generally at 74. These wheels and axles are driven by a front differential gear 75. The vehicle has rear wheels 76 and 77 which are driven mechanically from a rear differential gear 78 by axles within an axle housing 79. The vehicle carries a power plant 80, such as an internal combustion engine, having a power output shaft 81 which is connected to the input shaft 82 of a differential pump 83. This pump may be of any suitable type, for example, as described with reference to FIGS. 2–5 or in the aforesaid copending patent application, Ser. No. 82,561. It has an output shaft 84 which is mechanically coupled to the differential gear 75. A reversing gear box (like the box 25) may be interposed between the power shaft 81 and the input shaft 82, but can be omitted in the case of racing cars. The input shaft 85 of the rear differential gear 78 is mechanically coupled to the output shaft 86 of a variable- and positive-displacement hydraulic motor 87 having a control device for varying the displacement. This device is represented for simplicity by a lever 88, which is operable from the vehicle operator's compartment. The motor is hydraulically connected to the pump 83 by a high-pressure duct 89 and a return duct 90, which are connected respectively to the high-pressure output 91 and to the fluid inlet 92 of the pump. A by-pass duct 93, having a flow-control valve 94, preferably constructed like the valve 38 and having like characteristics, is connected across the pump. The valve can be controlled by a valve operator, represented by a tubular guide 135 which leads to a control element in the vehicle operator's compartment, whereby the valve can be opened and closed gradually. The parts 141–147 of FIG. 6 may be omitted when no gears are provided, but may be included, if desired, in passenger vehicles which have such gears.

Figure 10:
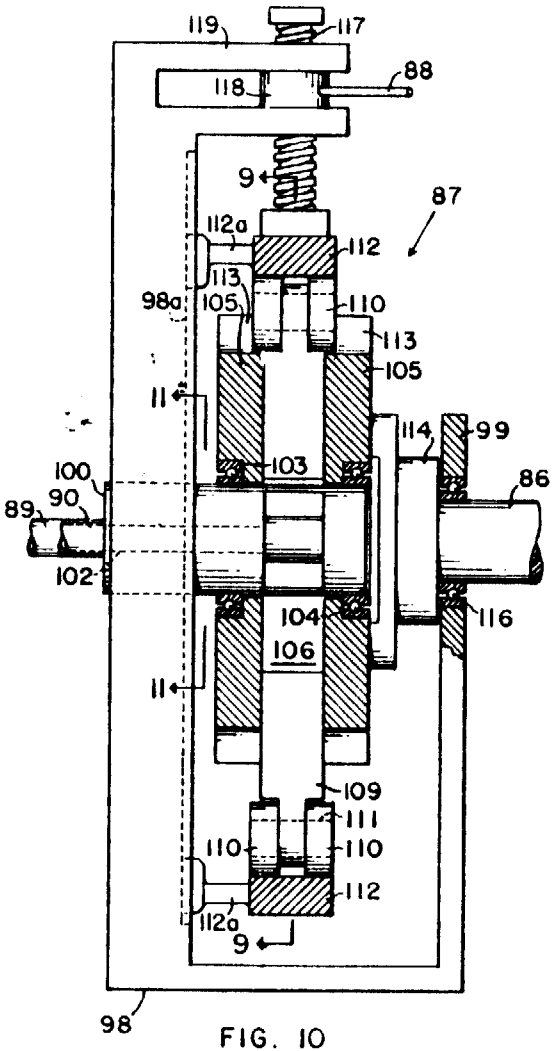
FIG. 10 is a longitudinal section through the hydraulic motor, parts appearing in elevation.
Figure 9:
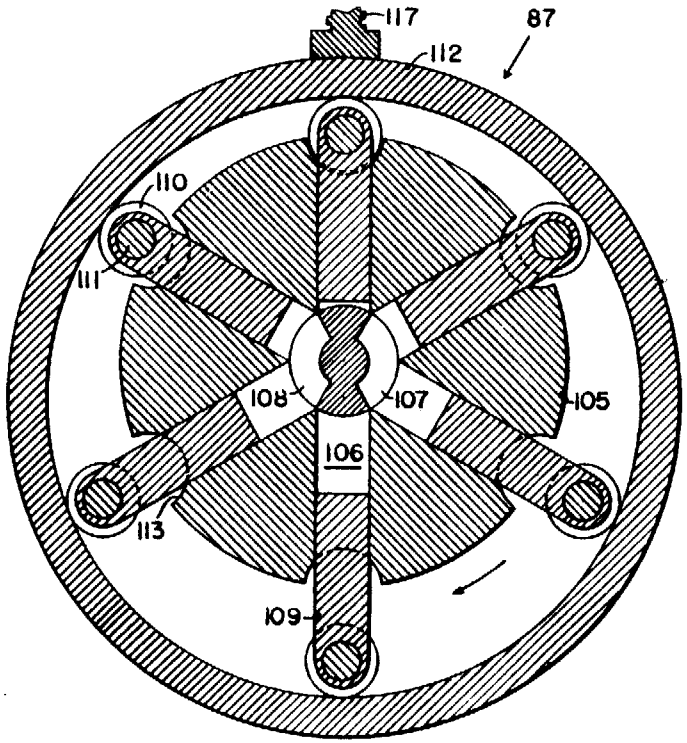
FIG. 9 is a transverse sectional view through a variable-displacement motor, taken on the line 9—9 of FIG. 10, suitable for use in the second and third embodiments.
Figure 11:
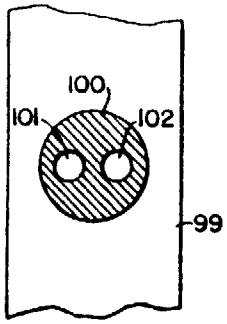
FIG. 11 is a section, taken on the line 11—11 of FIG. 10.

The variable-displacement motor 87, of any desired construction, may, for example, be as shown in FIGS. 9–11, wherein only the principal parts appear. It includes a stationary base 98 which carries a stationary spindle 100 having a pair of isolated bores 101 and 102 which are connected respectively to the high-pressure duct 89 and the return duct 90. Rotatably mounted on the spindle by means of bearings 103 and 104 is a rotor block 105 which is provided with any desired number, such as six to twelve, radial cylinder bores 106, six being shown. The spindle 100 has a pair of diametrically opposite recesses 107 and 108, which communicate respectively with the bores 101 and 102. These recesses are separated by diametrically opposite lands on the spindle, each land being sufficiently long about the spindle circumference to close the inner end of one of the bores 106. Each said bore contains a piston 109 the outlet end of which carries a pair of rollers 110 which are rotatable on a shaft 111 extending through and fixed to the piston. These rollers move in rolling engagement along the inner surface of a vertically adjustable control ring 112. Recesses 113 may be formed in the periphery of the block to accommodate the rollers 110. The cylinder block 105 is connected through a collar 14 to the motor output shaft 86 (also shown in FIG. 7) which rotates within a bearing 116 carried by an arm 99 of the base 98.

The control ring 112 carries fixed thereto a pair of lateral arms 112a which have vertical sliding motion in grooves 98a which are formed in the base 98. Thereby the ring 112 is constrained to vertical movement. Its vertical position is adjusted by a screw 117 which is fixed to the ring and extends parallel to the grooves 98a. This screw carries an internally threaded nut 118 which can be rotated by the radially extending lever 88 but is secured against vertical displacement by a bifurcated frame 119 fixed to the base 98. Thereby the position of the lever 88 determines the vertical position of the control ring 112. When this ring is concentric with the spindle 100 and rotor 105, the motor is at zero displacement. The ring is not moved about this concentric position.

When the ring 112 is eccentrically below the axis of the spindle 100, as shown, high-pressure fluid from the duct 89 flows through the bore 101 and recess 107 into the inner ends of those cylinders 106 which communicate with this recess. This causes the pistons in these cylinder bores to move outwardly and the block 105 rotates by the pressure of the rollers 110 against the ring 12. Simultaneously, the pistons at the other side of the block are moved inwardly by the ring 112, thereby expelling fluid via the recess 108 and bore 102 to the duct 90.

Figure 7:
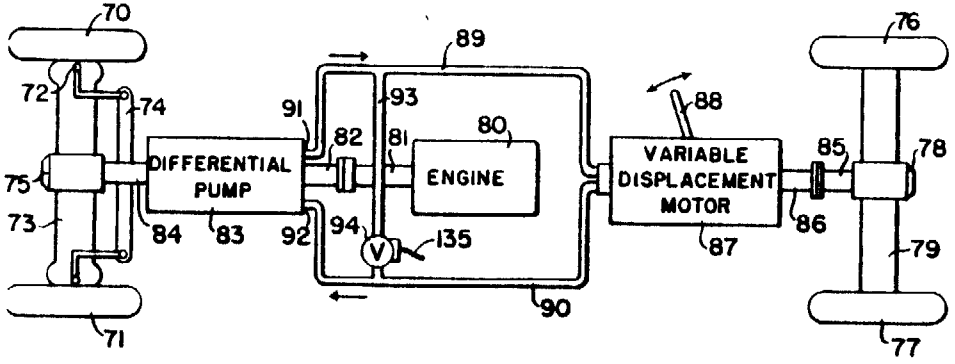
FIG. 7 is a diagrammatic plan of parts of another vehicle equipped with a hydraulic drive system according to a second embodiment.

Reverting to FIG. 7, the engine 80 is placed into operation with the vehicle at a standstill and the valve 94 open. The lever 88 is initially positioned to set the hydraulic motor 87 to maximum displacement. To place the vehicle into motion, the valve 94 is closed, as by gradually raising the lever 139 of FIG. 6. Torque is thereby applied to all four wheels, in the manner described for the first embodiment. However, by a choice of the maximum displacement of the motor, the torque applied to the rear wheels can be made either equal to or greater or smaller than that applied to the front wheels by the pump output shaft 84. As the vehicle gains speed, the displacement of the motor 87 is reduced progressively by the lever 88, thereby pumping less fluid for each revolution of the motor output shaft 86, and reducing the torque applied to the rear wheels. This reduction in the volumetric rate at which the differential pump delivers fluid increases the speed of the shaft 84, both the said volumetric rate and the shaft speed being in relation to the speed of the pump input shaft 82. (It is evident that the output shaft 84 corresponds to the shaft 26 of FIG. 2.) When the lever 88 is moved to reduce the motor displacement to zero (placing the control ring 112 concentric to the rotor 105) no torque is applied to the motor output shaft 86 and no fluid flows through the motor; the vehicle is then wholly in front-wheel drive, and the speed ratio between the shafts 82 and 84 is 1:1. In this condition flow of fluid from and to the pump is blocked.

It may be noted that, due to inherent inefficiency of the motor at very low displacements, the motor 87 ceases to deliver driving torque to the rear wheels already before the condition of zero displacement is reached.

It is evident that there has been provided a hydraulic drive system which provides good traction, using all four wheels, while the vehicle is accelerating, and a high gear ratio between the driven wheels and the engine at higher speeds. This eventually becomes a front-wheel drive, with the improved roadability inherent in such a drive. When the motor 87 is set for zero displacement the rear wheels 76 and 77 are free to rotate independently of the pump input shaft 82.

It may be further noted that the lever 88 can be moved to increase the motor displacement also while the vehicle is in motion, to gain traction and to reduce the gear ratio. This is useful when the vehicle is accelerating, ascending a grade, or encounters poor road traction conditions.

Figure 8:
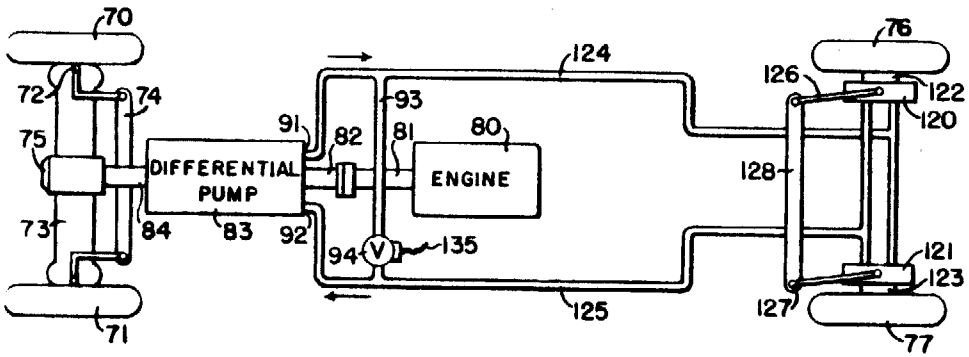
FIG. 8 is a diagrammatic plan of parts of still another vehicle equipped with a hydraulic drive system according to a third embodiment of the invention.

In the third embodiment, shown in FIG 8, each of the rear wheels 76 and 77 is driven by a separate, positive-displacement motor 120 or 121, the output shafts of which are coupled mechanically to the respective wheels, preferably through reduction gears 122 and 123, to permit operation of the motors at higher speeds and make it possible to use smaller motors. Thereby the rear wheel differential gear 78 of the second embodiment is obviated. The two hydraulic motors may be the variable-displacement type, as described for the second embodiment, or their effective displacements can be varied by a valve which alters their connections, as is described in the aforesaid copending patent application, Ser. No. 82,561 using fixed-displacement motors. These motors are shown to be connected in parallel to the differential pump 83 by branched ducts 124 and 125. The two displacement-control levers 126 and 127 of the hydraulic motors are advantageously mechanically coupled, as by a linkage generally indicated at 128 and operable from the vehicle operator's compartment, so that the displacements of the two motors are paried in unison. The reference numbers 70–77, 80–84, 91–94 and 135 denote parts previously described.

Except for the absence of the rear differential, operation of the third embodiment is as was described for the second embodiment.

It should be understood that the invention is not limited to the specific arrangements shown or to the construction of the differential pump and/or the hydraulic motor described. Thus, it is not essential to the invention that the front wheels be driven mechanically from the pump output shaft 84 in the second and third embodiments; instead, this shaft may drive the rear wheels and one or more hydraulic motors may drive the front wheels.

I claim as my invention:

1. In [a] self-propelled vehicle *means* having a power plant and a plurality of ground-engaging driving means situated on different axes which are displaced along the length of the vehicle *means*, a hydraulic drive system which comprises:

a. a differential pump having a power input shaft drivenly connected to said power plant, a positive-displacement pump having a fixed displacement, a high-pressure fluid outlet, a fluid inlet, a pump output shaft, and mechanical reacting means for driving said output shaft at a speed which varies, in relation to the speed of the said input shaft, inversely with the quantity of fluid flowing through said outlet and inlet, b. means mechanically and drivingly connecting said pump output shaft to at least one driving means on one of said axes, and c. a positive-displacement hydraulic motor having fluid intake and discharge openings connected by duct means respectively to said outlet and inlet of the pump, and a motor output shaft which is drivingly connected to at least one driving means on [the other] *another* of said axes.

2. In combination with the drive system defined in claim 1, by-pass duct means including a valve interconnecting said outlet and inlet of the pump, whereby the torque applied to both of said driving means can be reduced to substantially zero while the pump input shaft is driven, by opening said valve.

3. In combination with the drive system defined in claim 1, means for altering the gear ratio between the pump output shaft and said at least one driving means on the first-mentioned axis.

4. A multi-speed vehicle *means* according to claim 1 having means for blocking the flow of fluid to and from the differential pump, said blocking means being adjustable to active and inactive conditions, whereby a. at low vehicle speeds the blocking means can be made inactive to cause fluid from the differential pump to drive the hydraulic motor, and b. at high vehicle speeds the blocking means can be made active to transfer power from the pump input shaft substantially completely to the pump output shaft and to apply no driving power from the pump to the hydraulic motor.

5. The vehicle *means* defined in claim 4 wherein said driving means are wheels, there being at least two wheels on each of [said] *different* axes *and* situated on opposite sides of the vehicle *means*, said first-mentioned axis is at the front of the vehicle *means* and the other axis is at the rear, said pump output shaft is mechanically connected to drive both wheels at the front of the vehicle *means*, and there is a hydraulic motor for each of the wheels at the rear of the vehicle *means*, the latter wheels being mounted for independent rotation.

6. The drive system defined in claim 1 wherein said axes are situated at opposite ends of the vehicle *means*, said driving means are wheels, the vehicle means includes a pair of wheels mounted for independent rotation [of] *on* the first-*mentioned* of said axes, and the means mechanically and drivingly connecting said pump output shaft comprises a mechanical differential drivingly connected to said wheels, the said pump output shaft being drivingly connected to the input of said differential.

7. The drive system defined in claim 1 wherein said driving means on the [other of said] *last-mentioned axis* [axes] includes of pair of wheels mounted for independent rotation and the system includes a pair of hydraulic motors hydraulically connected in parallel to said differential pump, each *of* said [motor] *motors* having a motor output shaft which is drivingly connected to one of the wheels on said [other of said axes] *last-mentioned axis*.

8. The drive system defined in claim 1 wherein said hydraulic motor has a plurality of cylinders and pistons disposed for reciprocation of the pistons substantially radially from the axis of rotation of said motor output shaft.

9. The drive system defined in claim 1 wherein said differential pump includes a pump block containing a plurality of pump chambers having axes parallel to the axes of said pump input and output shafts, a swash plate inclined to said axes, and a plurality of pistons situated one within each pump chamber and in thrust relation to the swash plate, said block and swash plate being both rotatable, one fixed to said pump input shaft and the other to said pump output shaft.

10. A vehicle *means* and drive system as defined in claim 1 wherein the vehicle *means* comprises steerable front wheel means, the said driving means includes at least two rotatable wheels mounted for independent rotation at the opposite sides of the vehicle *means* on each of said axes, the wheels on one of said axes being mechanically coupled to said pump output shaft and the wheels on the other of said axes being mechanically coupled to the hydraulic motor *or motors*.

11. The vehicle *means* defined in claim 10 wherein said means mechanically and drivingly connecting the pump output shaft comprises a mechanical differential drivingly connected to the wheels on [said one] *the first-mentioned* axis, the input to the differential being coupled to said pump output shaft.

12. The combination defined in claim 11 which includes a pair of hydraulic motors hydraulically connected in parallel to said differential pump, each *of* said [motor] *motors* having a motor output shaft which is drivingly connected to one of the wheels on [the other of] said *last-mentioned axis* [axes].

13. The combination defined in claim 10 wherein said hydraulic motor is a fixed-displacement motor.

14. A drive system as defined in claim 1 wherein said axes are situated at opposite ends of the vehicle *means* and said hydraulic motor has means for varying the effective displacement thereof, whereby the torque applied to the last-mentioned driving means can be varied while altering the speed ratio of the pump input shaft to the pump output shaft.

15. The combination defined in claim 14 wherein said driving means on the first-*mentioned axis* [of said axes] comprises a pair of wheels mounted on opposite sides of the vehicle *means* for independent rotation, and the means mechanically and drivingly connecting said pump output shaft comprises a mechanical differential drivingly connected to said wheels, the said pump output shaft being drivingly connected to the input of said differential.

16. The combination defined in claim 14 wherein said driving means on the [said other] *last-mentioned* axis comprises a pair of wheels mounted on opposite sides of the vehicle *means* for independent rotation and a mechanical differential drivingly connected to said wheels, the motor output shaft being drivingly connected to the input of said differential.

17. The combination defined in claim 14 wherein said driving means on the [said other] *last-mentioned* axis comprises a pair of wheels mounted on opposite sides of the vehicle *means* for independent rotation, there being a pair of positive-displacement motors connected to said differential pump for receiving and returning fluid from and to the pump, and each motor has means for varying the effective displacement thereof, the output shaft of each motor being drivingly connected to one of said wheels.

18. In combination with the drive system defined in claim 1, gear-reduction means interposed between said hydraulic motor and the drive means driven thereby, whereby said motor can operate at a speed greater than that of said drive means.

References Cited

The following references, cited by the Examiner, are of record in the patented file of this patent or the original patent.

UNITED STATES PATENTS

| | | | |
|---|---|---|---|
| 1,840,866 | 1/1932 | Rayburn et al. | 60—329 |
| 2,556,758 | 6/1951 | Haynes et al. | 60—494 |
| 3,261,421 | 7/1966 | Forster et al. | 180—66 R |
| 3,292,723 | 12/1966 | Pinkerton et al. | 180—44 F |

FOREIGN PATENTS

| | | | |
|---|---|---|---|
| 1,071,661 | 6/1967 | Great Britain | 180—44 F |

KENNETH H. BETTS, Primary Examiner

U.S. Cl. X.R.

180—44 M